United States Patent
Rivera

(10) Patent No.: US 9,113,747 B2
(45) Date of Patent: Aug. 25, 2015

(54) SINGLE AND MULTI-CUP COFFEE MAKER

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 244 days.

(21) Appl. No.: 13/668,458

(22) Filed: Nov. 5, 2012

(65) Prior Publication Data
US 2013/0068108 A1    Mar. 21, 2013

Related U.S. Application Data

(63) Continuation-in-part of application No. 13/644,501, filed on Oct. 4, 2012, and a continuation-in-part of application No. 12/960,496, filed on Dec. 4, 2010, and a continuation-in-part of application No. 12/762,262, filed on Apr. 16, 2010, and a continuation-in-part of application No. 12/620,584, filed on Nov. 17, 2009, now Pat. No. 8,291,812, and a continuation-in-part of application No. 12/610,981, filed on Nov. 2, 2009, now abandoned.

(51) Int. Cl.
*A47J 31/44* (2006.01)
*A47J 31/06* (2006.01)

(52) U.S. Cl.
CPC ............ *A47J 31/446* (2013.01); *A47J 31/0647* (2013.01); *A47J 31/4403* (2013.01); *A47J 31/4482* (2013.01)

(58) Field of Classification Search
CPC .......................... A47J 31/4482; A47J 31/4403
USPC .................. 99/295, 302 R, 287, 307, 284
See application file for complete search history.

(56) References Cited

U.S. PATENT DOCUMENTS

| | | |
|---|---|---|
| 2,433,815 A | 12/1947 | Laforge |
| 3,022,411 A | 2/1962 | Soper et al. |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenbert et al. |
| 3,384,004 A | 5/1968 | Perlman et al. |
| 3,405,630 A | 10/1968 | Weber, III |
| 3,583,308 A | 6/1971 | Williams |
| 3,607,297 A | 9/1971 | Fasano |
| 3,757,670 A | 9/1973 | Laama et al. |
| 3,844,206 A | 10/1974 | Weber |
| 3,958,502 A | 5/1976 | Vitous |

(Continued)

FOREIGN PATENT DOCUMENTS

WO    WO 2005/092160 A1    10/2005

*Primary Examiner* — Reginald L Alexander
(74) *Attorney, Agent, or Firm* — Kenneth L. Green; Averill & Green

(57) ABSTRACT

A coffee maker and coffee holder cooperate to provide either single-cup or multi-cup brewing. A single-cup coffee holder in insertable into the coffee maker for preparing a single serving of coffee, and a multi-serving coffee holder is insertable into the coffee maker for preparing multiple servings of coffee. A coffee holder lid is attached to the coffee maker and is configured to close both the singe serving and multi-serving coffee holders. The holder lid is configured to either spray heated water into the coffee holders, or to inject the heated water through needles into coffee in the coffee holder. In one embodiment, the coffee is held in a filter paper package with a rim, and the rim is sandwiched between the coffee holder and the holder cover. A tamper may be included which tamps the coffee before brewing.

17 Claims, 20 Drawing Sheets

(56) References Cited

U.S. PATENT DOCUMENTS

| | | |
|---|---|---|
| 4,164,644 A | 8/1979 | Remsnyder et al. |
| 4,253,385 A | 3/1981 | Illy |
| 4,286,515 A | 9/1981 | Baumann et al. |
| 4,603,621 A | 8/1986 | Roberts |
| 4,703,687 A | 11/1987 | Wei |
| 4,800,089 A | 1/1989 | Scott |
| 4,998,463 A | 3/1991 | Precht et al. |
| 5,000,082 A | 3/1991 | Lassota |
| 5,012,629 A | 5/1991 | Rehman |
| 5,046,409 A | 9/1991 | Henn |
| 5,123,335 A | 6/1992 | Aselu |
| 5,171,457 A | 12/1992 | Acuff et al. |
| 5,197,374 A * | 3/1993 | Fond ................................ 99/295 |
| 5,233,914 A | 8/1993 | English |
| 5,325,765 A | 7/1994 | Sylvan et al. |
| 5,335,589 A | 8/1994 | Yerves et al. |
| 5,526,733 A | 6/1996 | Klawuhn et al. |
| 5,582,730 A | 12/1996 | Hugentobler |
| 5,636,563 A | 6/1997 | Oppermann et al. |
| 5,649,412 A | 7/1997 | Binacchi |
| 5,676,041 A | 10/1997 | Glucksman et al. |
| 5,829,340 A | 11/1998 | Yang |
| 5,840,189 A | 11/1998 | Sylvan et al. |
| 5,870,943 A | 2/1999 | Levi et al. |
| 5,887,508 A | 3/1999 | Estaun |
| 5,895,672 A | 4/1999 | Cooper |
| 6,118,933 A | 9/2000 | Roberson |
| D431,423 S | 10/2000 | Ohm et al. |
| 6,136,352 A | 10/2000 | Silverstein et al. |
| 6,164,191 A | 12/2000 | Liu et al. |
| 6,189,438 B1 | 2/2001 | Biefeldt et al. |
| D454,433 S | 3/2002 | Peter |
| D454,434 S | 3/2002 | McDaniel et al. |
| 6,440,256 B1 | 8/2002 | Gordon et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,708,600 B2 | 3/2004 | Winkler et al. |
| 6,727,484 B2 | 4/2004 | Policappelli |
| 6,740,345 B2 | 5/2004 | Cai |
| 6,777,007 B2 | 8/2004 | Cai |
| 6,832,542 B2 | 12/2004 | Hu et al. |
| 6,843,165 B2 | 1/2005 | Stoner et al. |
| D502,362 S | 3/2005 | Lazaris et al. |
| 6,904,840 B1 | 6/2005 | Pfeifer et al. |
| 6,948,420 B2 | 9/2005 | Kirschner et al. |
| 7,047,870 B2 | 5/2006 | Gantt et al. |
| 7,081,263 B2 | 7/2006 | Albrecht |
| 7,093,530 B2 * | 8/2006 | Meister et al. .................. 99/295 |
| 7,131,369 B2 | 11/2006 | Gantt et al. |
| 7,320,274 B2 | 1/2008 | Castellani |
| 7,377,089 B2 | 5/2008 | Rapparini |
| 7,726,233 B2 * | 6/2010 | Kodden et al. .................. 99/284 |
| 7,798,055 B2 * | 9/2010 | Mandralis et al. .............. 99/295 |
| 7,946,217 B2 | 5/2011 | Favre et al. |
| 8,047,127 B2 | 11/2011 | Lin |
| 2002/0035929 A1 | 3/2002 | Kanba et al. |
| 2002/0148356 A1 | 10/2002 | Lazaris et al. |
| 2003/0200872 A1 | 10/2003 | Lin |
| 2004/0005384 A1 | 1/2004 | Cai |
| 2004/0118290 A1 | 6/2004 | Cai |
| 2005/0236323 A1 | 10/2005 | Oliver et al. |
| 2005/0257695 A1 | 11/2005 | Dobranski et al. |
| 2006/0159815 A1 | 7/2006 | Crook et al. |
| 2006/0174769 A1 | 8/2006 | Favre et al. |
| 2006/0196364 A1 | 9/2006 | Kirschner |
| 2006/0254428 A1 | 11/2006 | Glucksman et al. |
| 2007/0259074 A1 | 11/2007 | Searchilli et al. |
| 2009/0229471 A1 | 9/2009 | Lun et al. |
| 2010/0083843 A1 | 4/2010 | Denisart et al. |
| 2011/0274802 A1 | 11/2011 | Rivera |
| 2012/0207895 A1 | 8/2012 | Rivera |
| 2012/0207896 A1 | 8/2012 | Rivera |
| 2012/0276264 A1 | 11/2012 | Rivera |
| 2013/0199378 A1 * | 8/2013 | Yoakim et al. .................. 99/283 |

* cited by examiner

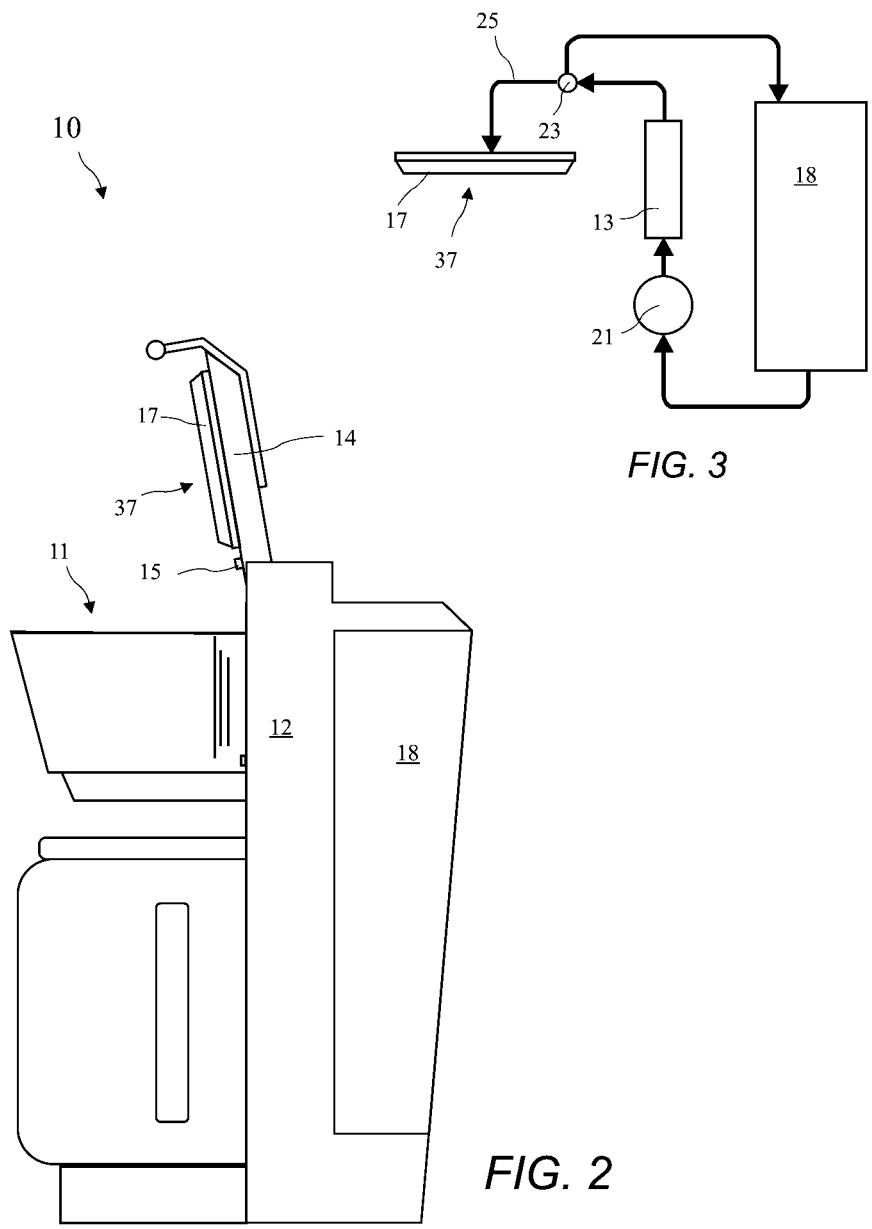

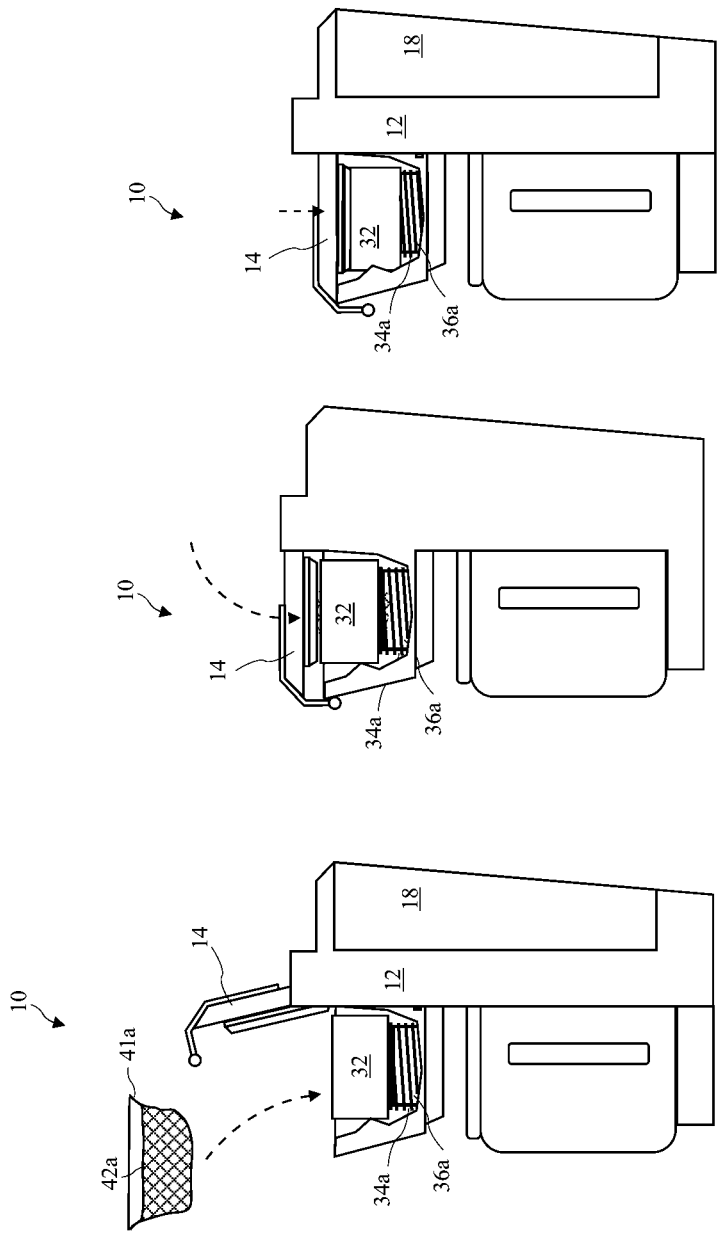

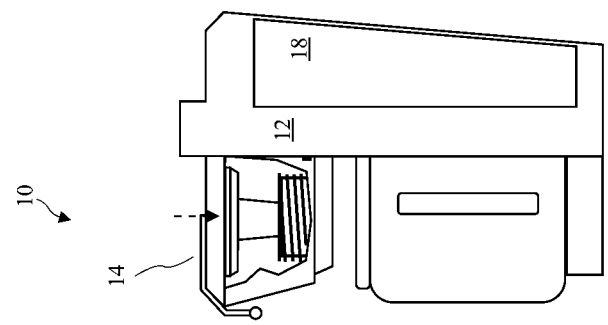
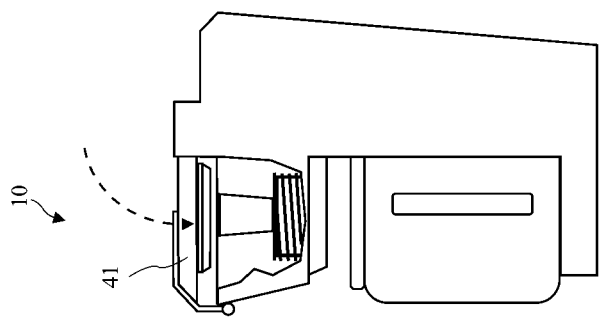
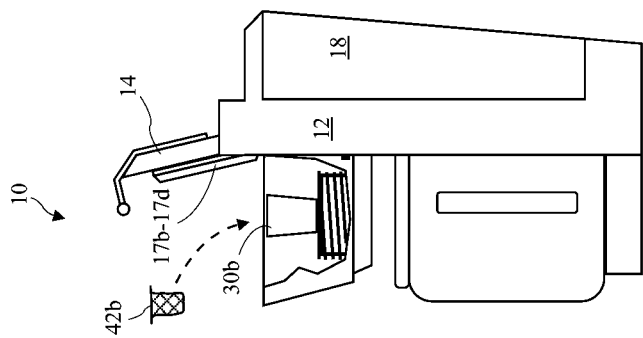

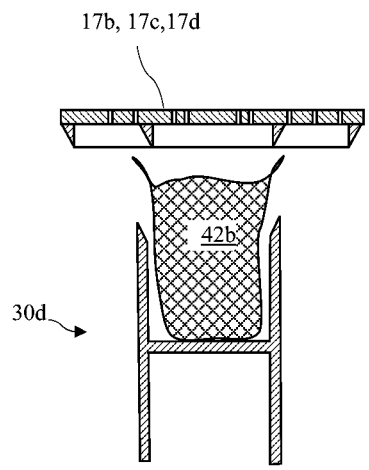
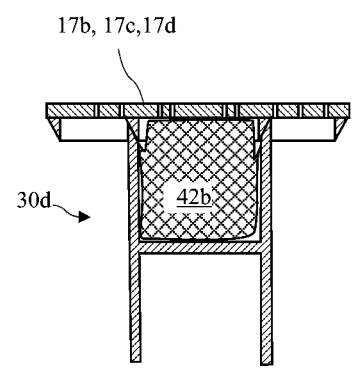
FIG. 24A     FIG. 24B
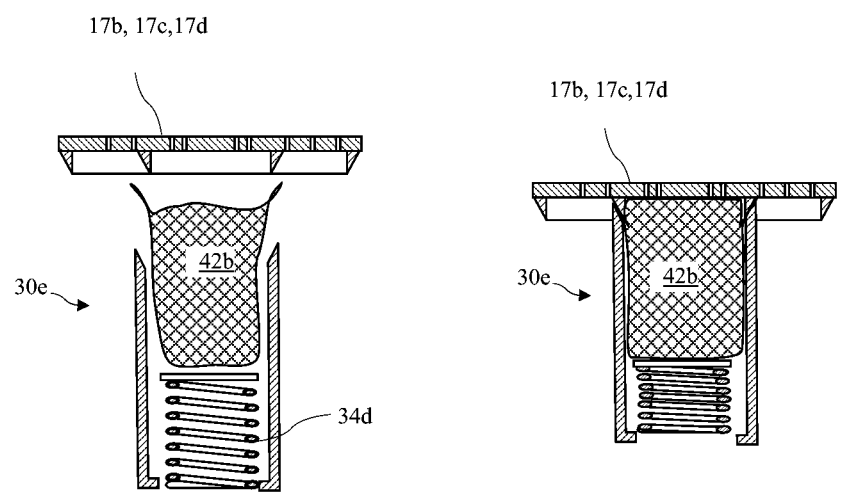
FIG. 25A     FIG. 25B

SINGLE AND MULTI-CUP COFFEE MAKER

CROSS-REFERENCE TO RELATED APPLICATIONS

The present application is a Continuation In Part of U.S. patent application Ser. No. 12/610,181 filed Oct. 30, 2009, and U.S. patent application Ser. No. 12/620,584 filed Nov. 17, 2009, and of U.S. patent application Ser. No. 12/762,262 filed Apr. 16, 2010, and of U.S. patent application Ser. No. 12/960,496 filed Dec. 4, 2010, and of U.S. patent application Ser. No. 13/644,501 filed Oct. 12, 2012, which applications are incorporated in their entirety herein by reference.

BACKGROUND OF THE INVENTION

The present invention relates to coffee makers and in particular to a coffee maker utilizing a stream of hot water through tamped ground coffee.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 12/610,181 filed Oct. 30, 2009 for "Self Tamping Coffee Holder" filed by the present applicant further discloses a coffee making apparatus and methods which provide a tamped packing of loose ground coffee thereby obtaining richer flavor. The coffee maker includes a reservoir, a pump, a heater, and a check valve. Coffee grounds are first loosely deposited in a coffee holder and then tamped onto a compacted state. The coffee holder may be filled loosely with the coffee and then placed into the coffee making apparatus and compacted, or the coffee may be compacted in the coffee holder and then the coffee holder placed into the coffee making apparatus. The compacting may be by a spring or by a resilient solid material and may be part of the coffee holder or part of the coffee making apparatus.

Further, U.S. patent application Ser. No. 12/620,584 filed Nov. 17, 2009 for "Self Tamping Coffee Holder" filed by the present applicant further discloses a self-tamping coffee holder which tamps loose ground coffee obtaining richer flavor. The coffee holder includes a holder base and a holder cap. Coffee is loosely deposited in the coffee holder and the holder cap is attached to the holder base. An internal filter chamber holds the coffee and allows tamping of the coffee into a compacted state. The filter chamber may be formed by a fixed filter or by a removable filter constructed of filter paper, nylon mesh, metal mesh, or any material capable of holding the coffee while allowing a flow of heated water through the coffee. The tamping may be by a spring or by a resilient solid material attached to the coffee holder and may push the coffee down inside the filter or push the filter and the coffee up against the holder lid. While the '181 and '584 applications disclose tamping coffee, they do not disclose a variety of embodiments of cooperating coffee holders and coffee makers for tamping.

Further, there are various times when a single serving, and multiple servings, of coffee are desired. Because counter space is limited in both commercial and residential settings, it is often undesirable to provide space for both a single serving and multi serving coffee maker. Thus, a need is evident for a coffee maker providing both tamping, and selectable single and multi-cup modes.

BRIEF SUMMARY OF THE INVENTION

The present invention addresses the above and other needs by providing a coffee maker and coffee holder cooperate to provide either single-cup or multi-cup brewing. A single-cup coffee holder in insertable into the coffee maker for preparing a single serving of coffee, and a multi-serving coffee holder is insertable into the coffee maker for preparing multiple servings of coffee. A coffee holder lid is attached to the coffee maker and is configured to close both the singe serving and multi-serving coffee holders. The holder lid is configured to either spray heated water into the coffee holders, or to inject the heated water through needles into coffee in the coffee holder. In one embodiment, the coffee is held in a filter paper package with a rim, and the rim is sandwiched between the coffee holder and the holder cover. A tamper may be included which tamps the coffee before brewing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 is a side view of the multi-mode coffee maker with an open lid allowing placement of a coffee holder according to the present invention inside the coffee maker.

FIG. 3 is a functional diagram of the multi-mode coffee maker according to the present invention.

FIG. 14A shows a multi-serving of brewing material being placed into the coffee maker according to the present invention.

FIG. 14B shows a coffee maker lid closed over the multi-serving of brewing material in the coffee maker according to the present invention.

FIG. 14C shows a coffee maker lid tamping the multi-serving of brewing material in the coffee maker according to the present invention.

FIG. 20A shows a single-serving of brewing material being placed into a second single serving holder in the coffee maker according to the present invention.

FIG. 20B shows the coffee maker lid closed over the single-serving of brewing material in the second single serving holder in the coffee maker, before tamping, according to the present invention.

FIG. 20C shows the coffee maker lid closed over the single-serving of brewing material in the second single serving holder in the coffee maker, after tamping, according to the present invention.

FIG. 24A shows a single serving coffee holder with a fixed volume before tamping, according to the present invention.

FIG. 24B shows the single serving coffee holder with a fixed volume after tamping, according to the present invention.

FIG. 25A shows a single serving coffee holder with a spring under a single serving package limiting an increase in volume after tamping, before tamping, according to the present invention.

FIG. 25B shows the single serving coffee holder with a spring under the single serving package limiting an increase in volume after tamping, after tamping, according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1C:
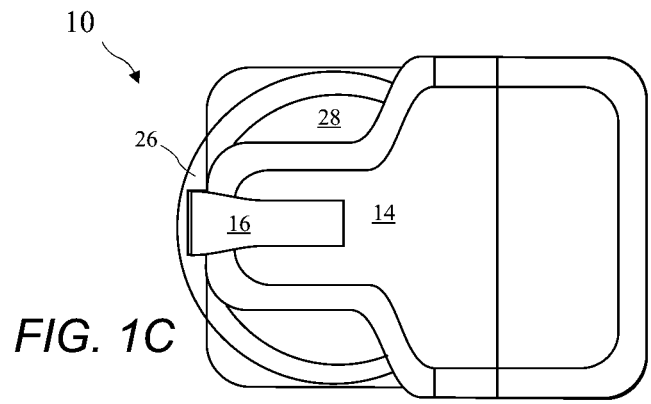
FIG. 1C is a top view of the multi-mode coffee maker according to the present invention.
Figure 1A:
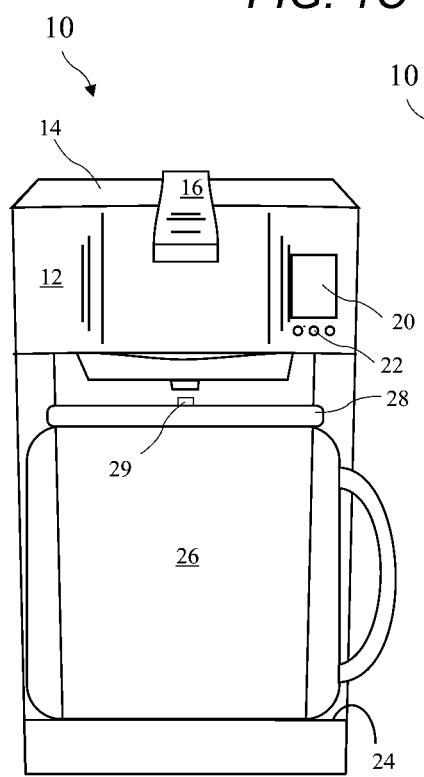
FIG. 1A is a front view of a multi-mode coffee maker according to the present invention.
Figure 1B:
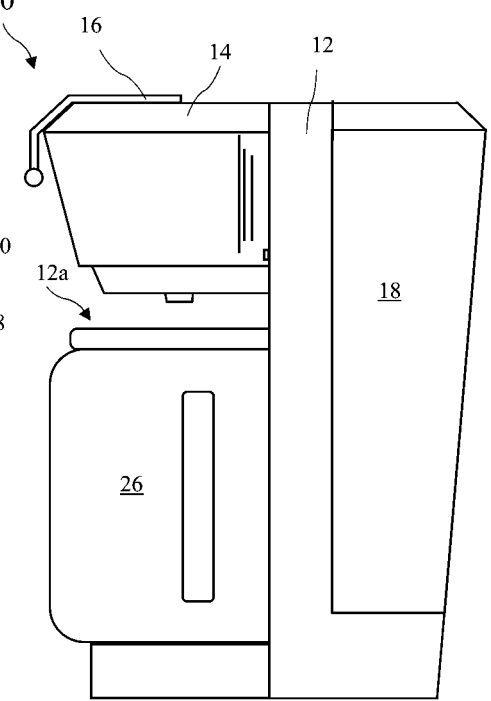
FIG. 1B is a side view of the multi-mode coffee maker according to the present invention.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, a coffee maker lid 14, a lid handle 16, a water container 18, a display 20, controls 22, a platform 24 and a mouth 12a. A coffee pitcher 26 rests on the platform 24 inside the mouth 12a and has a pitcher lid 28. The coffee maker includes a switch 29 cooperating with the pitcher 26 to allow multi-cup operation only when a pitcher 26 is present. The coffee maker 10 provides a flow of hot water through coffee grounds to produce a coffee drink. The flow of water may be heated by one of any known means, for example, an electrical heating coil, a conductive coating on tubing carrying the water, or inductive heating.

A side view of the coffee maker 10 with an open lid 14 allowing placement of a coffee holder inside a holder receptacle 11 of the coffee maker 10 is shown in FIG. 2. The lid 14 includes a switch 15 providing a signal when the lid 14 is closed to allow coffee making. A coffee holder lid 17 resides on a bottom surface of the lid 14 and presses against a single cup coffee holder 30 (see FIG. 4B) or multi coffee holder 32 (see FIG. 4A) residing in the coffee maker 10 when the lid 14 is closed. The lid 14, in cooperation with other means disclosed hereafter, tamps coffee contained in the coffee holders 30 and 32. Passages or needles in the lid 14 directs the flow of hot water into the coffee holders 30 and 32. A lid mating face 37 on the bottom of the coffee holder lid 17 closes against the coffee holder 30 or 32 and includes inner passages 19a for releasing liquid into the coffee holder 30 and outer passages 19b for releasing liquid into the coffee holder 32.

A functional diagram of the coffee maker 10 is shown in FIG. 3. One embodiment of the coffee maker 10 includes the water tank 18, water pump 21, a heater 13, check valve 23 and the lid 17. The pump 21 preferably provides at least one PSI water pressure. The water heater 13 may include a heating coil, or a resistive coating, or an induction heater, or any other means for heating water. The check valve 23 limits the water pressure at the nozzle 19 by returning some of the water flow to the water tank 18. While a water pump 21 is a preferred method for providing a flow of water to the nozzle 19, other methods include pressurizing the water in the water tank 18, and a coffee maker using any means to provide a forced flow of water is intending to within the scope of the present invention.

Figure 4A:
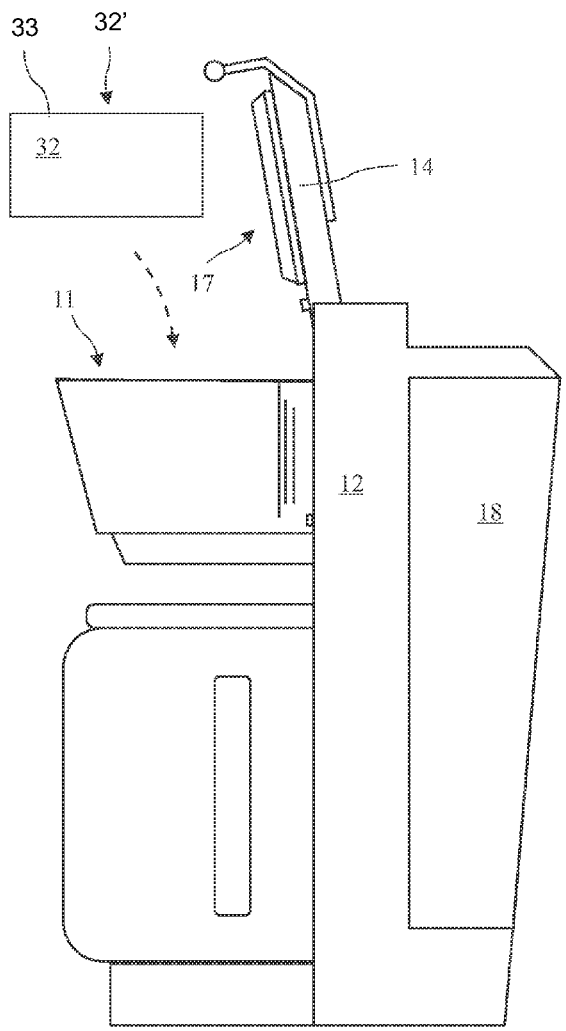
FIG. 4A is a side view of the multi-mode coffee maker receiving a multi serving coffee holder according to the present invention.
Figure 4B:
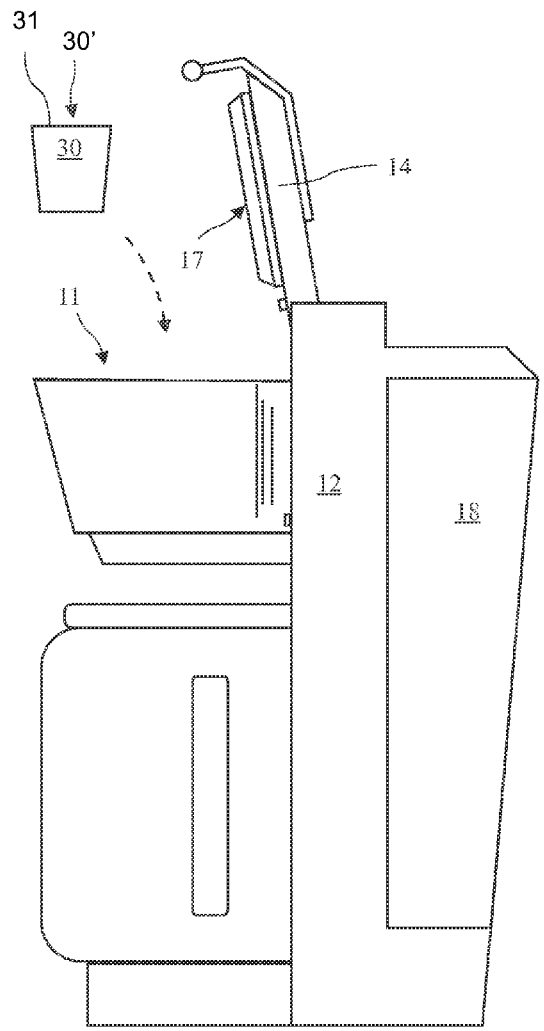
FIG. 4B is a side view of the multi-mode coffee maker receiving a single serving coffee holder according to the present invention.

FIG. 4A is a side view of the multi-mode coffee maker 10 receiving a multi serving coffee holder 32 having a multi serving interior 32' a multi serving mouth 33 and FIG. 4B is a side view of the multi-mode coffee maker 10 receiving a single serving coffee holder 30 having a single serving interior 30' and single serving mouth 31. The coffee holders 30 and 32 are inserted into a holder cavity 11. The multi-serving holder 32 may remain in the coffee maker 10 when the single serving holder 30 is inserted, or may be removed prior to inserting the single serving holder 30. The holder lid 17 is closed over both the single serving holder 30 and the multi-serving holder 32 after coffee is placed into the holders 30 and 32.

Figure 5A:
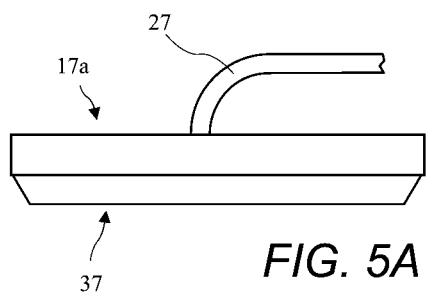
FIG. 5A is a side view of a first embodiment of a coffee holder lid according to the present invention.
Figure 5B:
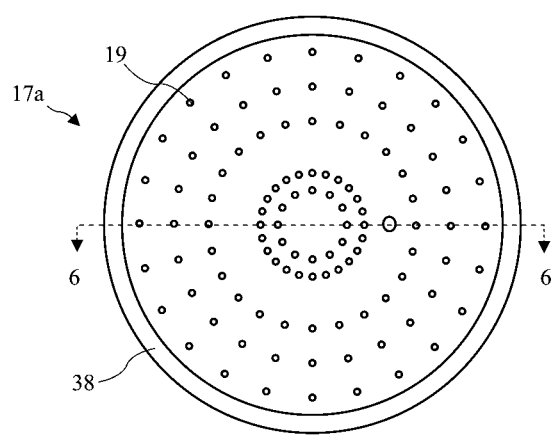
FIG. 5B is a bottom view of the first embodiment of a coffee holder lid according to the present invention.
Figure 6:
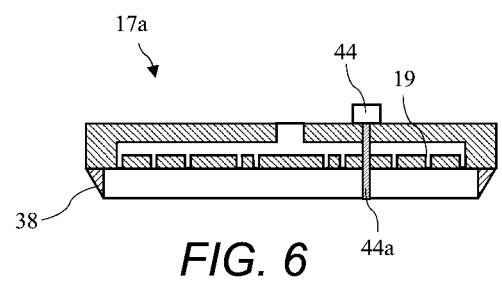
FIG. 6 is a cross-sectional view of the first embodiment of a coffee holder lid according to the present invention taken along line 6-6 of FIG. 5B.

FIG. 5A is a side view of a first embodiment of a coffee holder lid 17a, FIG. 5B is a bottom view of the coffee holder lid 17a, and FIG. 6 is a cross-sectional view of the coffee holder lid 17a taken along line 6-6 of FIG. 5B. The coffee holder lid 17a includes a single water line 27 carrying water to the coffee holder lid 17a, a mode switch comprising a single serve probe 44a for sensing the presence of the single serving holder 30, and a switch 44 selecting a water volume for multi-servings or for a single serving. Water passages 1 carry the water from the water line 27 to spray into coffee brewing material.

Figure 7A:
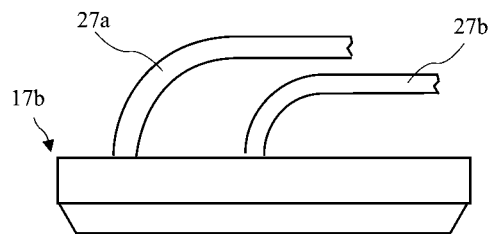
FIG. 7A is a side view of a second embodiment of a coffee holder lid according to the present invention.
Figure 7B:
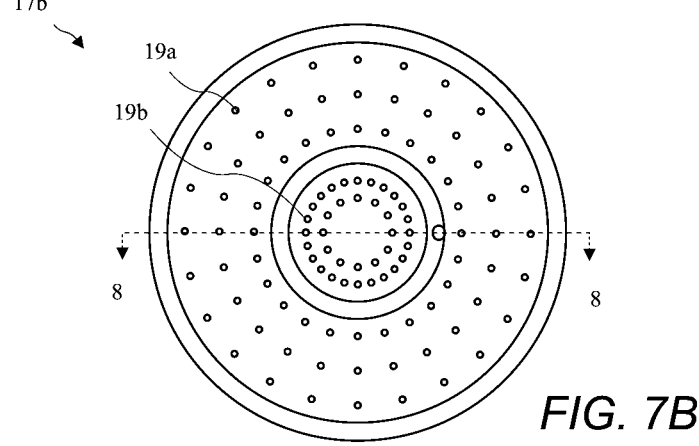
FIG. 7B is a bottom view of the second embodiment of a coffee holder lid according to the present invention.
Figure 8A:
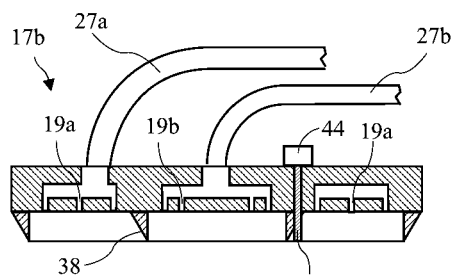
FIG. 8A is a cross-sectional view of the second embodiment of a coffee holder lid with a single serve probe in a multi-serving position according to the present invention, taken along line 8-8 of FIG. 7B.
Figure 8B:
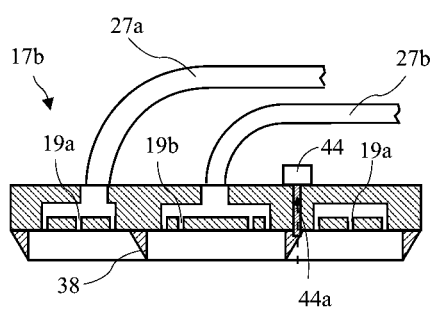
FIG. 8B is a cross-sectional view of the second embodiment of a coffee holder lid with a single serve probe in a single serving position according to the present invention, taken along line 8-8 of FIG. 7B.

FIG. 7A is a side view of a second embodiment of a coffee holder lid 17b, FIG. 7B is a bottom view of the coffee holder lid 17b, FIG. 8A is a cross-sectional view of the coffee holder lid 17 b with a single serve probe 44a in a multi-serving position, taken along line 8-8 of FIG. 7B, and FIG. 8B is a cross-sectional view of the coffee holder lid 17b with the single serve probe 44a in a single serving position, taken along line 8-8 of FIG. 7B. The single serving switch 44 controls valves which control the flow of water to the water lined 27a and 27b to provide water to only the holder 30, or to both holders 30 and 32.

Figure 9A:
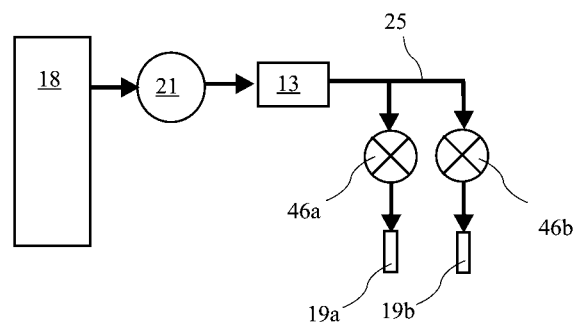
FIG. 9A is a first control valve arrangement according to the present invention.
Figure 9B:
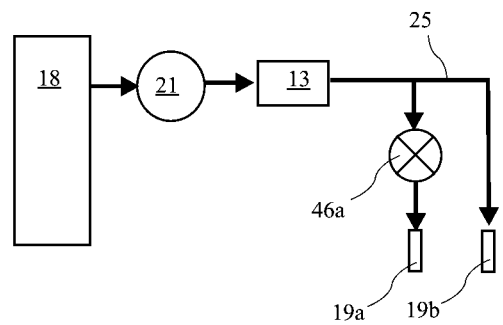
FIG. 9B is a second control valve arrangement according to the present invention.

FIG. 9A is a first control valve arrangement. Valves 46a and 46b control the flow of water to the passages (or needles) 19a and 19b.

FIG. 9A is a second control valve arrangement. Water is always provided to the passages 19b for the single serving holder 30, and is controlled by the valve 46a for the multi-serving holder 32.

Figure 10A:
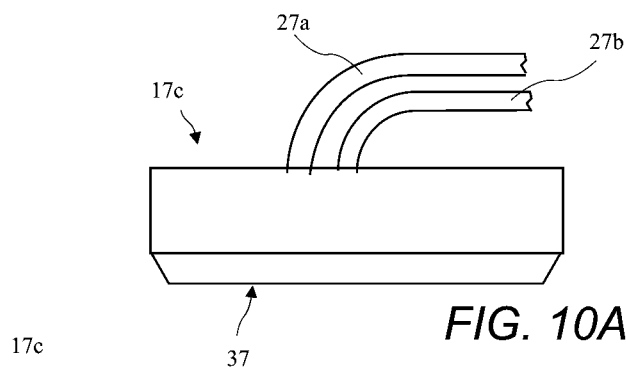
FIG. 10A is a side view of a third embodiment of a coffee holder lid according to the present invention.
Figure 10B:
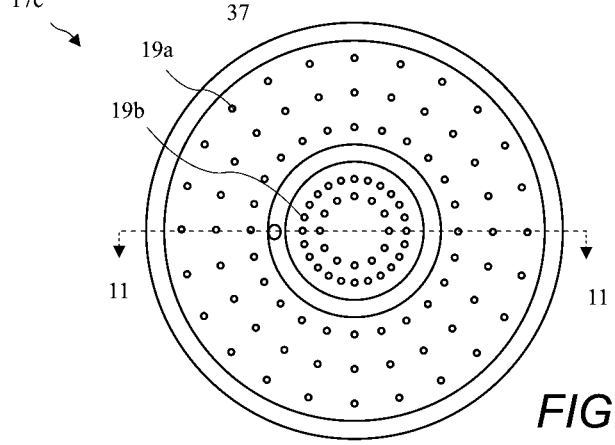
FIG. 10B is a bottom view of the third embodiment of a coffee holder lid according to the present invention.
Figure 11A:
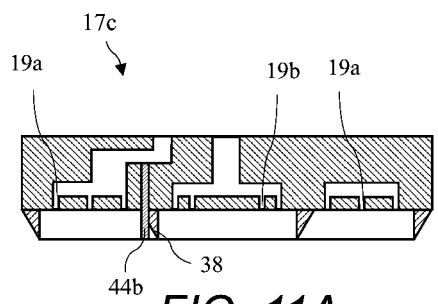
FIG. 11A is a cross-sectional view of the third embodiment of a coffee holder lid with water flowing to single and multi-serving holders according to the present invention taken along line 11-11 of FIG. 10B.
Figure 11B:
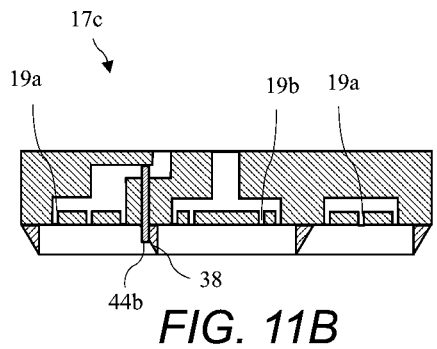
FIG. 11B is a cross-sectional view of the third embodiment of the coffee holder lid with water flowing to the single holder only, according to the present invention taken along line 11-11 of FIG. 10B.

FIG. 10A is a side view of a third embodiment of a coffee holder lid 17c, FIG. 10B is a bottom view of the coffee holder lid 17c, FIG. 11A is a cross-sectional view of the coffee holder lid 17c with water flowing to single and multi-serving holders 30 and 32, taken along line 11-11 of FIG. 10B, and FIG. 11B is a cross-sectional view of the coffee holder lid 17c with water flowing to the single holder 30 only, according to the present invention taken along line 11-11 of FIG. 10B. The probe 44b intersects a passage connecting the water line 27a and passages 19a. When a single serving holder 30 is present, the single serving holder mouth 31 (see FIGS. 21A and 22A), pushes the probe 44b upward to block the flow of water outside the holder 30.

Figure 12A:
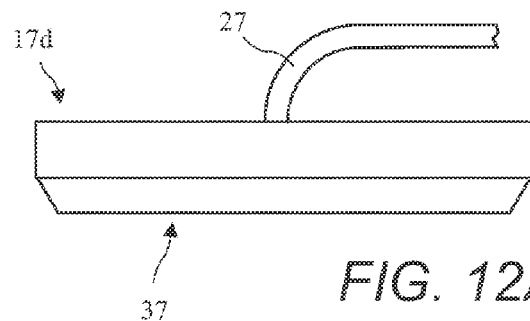
FIG. 12A is a side view of a fourth embodiment of a coffee holder lid according to the present invention.
Figure 12B:
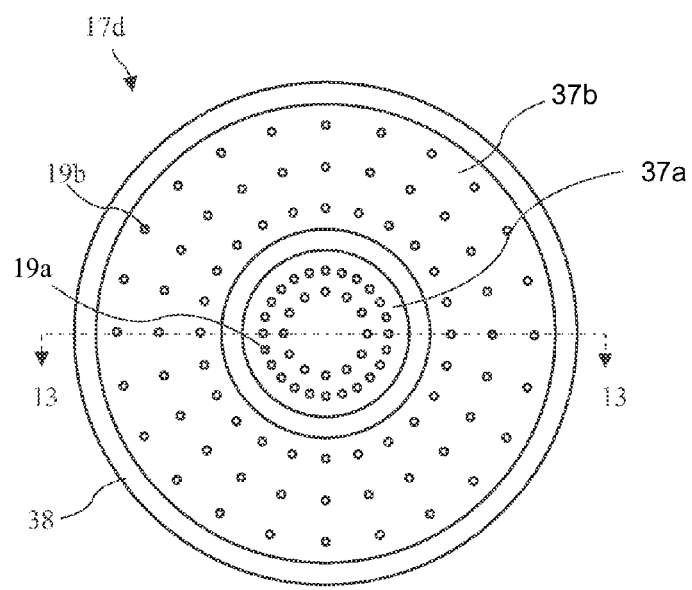
FIG. 12B is a bottom view of the fourth embodiment of a coffee holder lid according to the present invention.
Figure 13A:
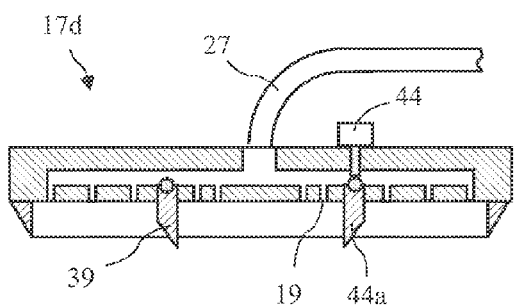
FIG. 13A is a cross-sectional view of the fourth embodiment of a coffee holder lid with a gate open providing water to both the single and multi-serving holders according to the present invention taken along line 13-13 of FIG. 12B.
Figure 13B:
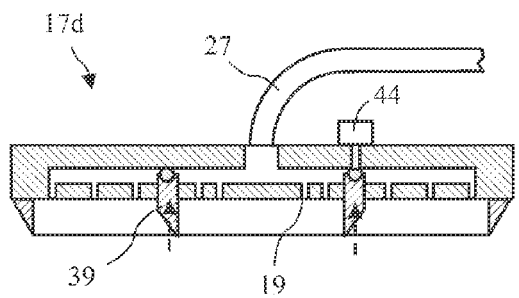
FIG. 13B is a cross-sectional view of the fourth embodiment of a coffee holder lid with the gate closed providing water to only the single serving holder according to the present invention taken along line 13-13 of FIG. 12B

FIG. 12A is a side view of a fourth embodiment of a coffee holder lid 17d, FIG. 12B is a bottom view of the coffee holder lid 17d, FIG. 13A is a cross-sectional view of the coffee holder lid 17d with a gate 39 open providing water to both the single and multi-serving holders 30 and 32, taken along line 13-13 of FIG. 12B, and FIG. 13B is a cross-sectional view of the coffee holder lid 17d with the gate 39 closed providing water to only the single serving holder 30, taken along line 13-13 of FIG. 12B. A single serving area 37a cooperates the single serving holder 20 to provide water to the single serving mouth 31, and combination of the single serving area 37a and a multi serving area 37b cooperates with the multi serving holder 32 to provide water to the multi serving mouth 33. The gate 39 is pushed upwards by the single serving holder 30 to limit providing water to only the single serving holder 30.

FIG. 14A shows a multi-serving of brewing material 42a being placed into the coffee maker 10, FIG. 14B shows the coffee maker lid 14 closed over the multi-serving of brewing material 42a in the coffee maker 10, and FIG. 14C shows the coffee maker lid 14 tamping the multi-serving of brewing material 42a in the coffee maker 10. A first closing motion of the coffee maker lid positions the holder cover 17 onto the holder 32 and a second motion of the lid 14 pushes the holder downward tamping the multi-serving of brewing material 42a.

Figure 15A:
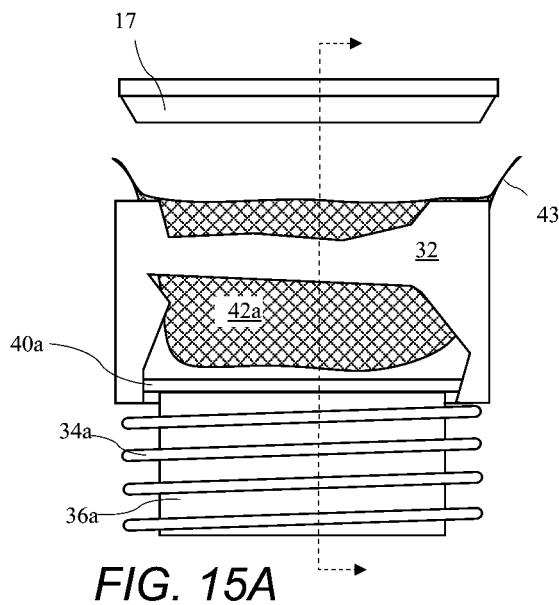
FIG. 15A shows a cut-away view of the multi-serving of brewing material, the multi-serving holder, and a multi-serving tamping pedestal before tamping according to the present invention.
Figure 15B:
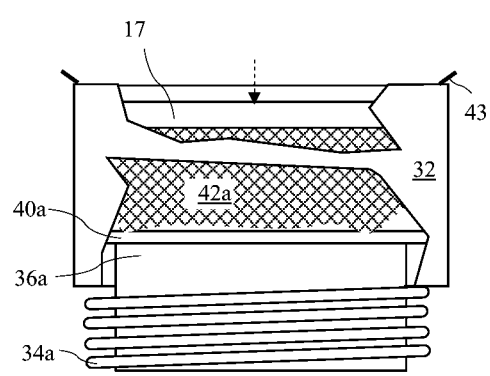
FIG. 15B shows a cut-away view of the multi-serving of the brewing material, the multi-serving holder, and the multi-serving tamping pedestal after tamping according to the present invention.

FIG. 15A shows a cut-away view of the multi-serving of brewing material 42a, the multi-serving holder 32, and a multi-serving tamping pedestal 36a before tamping, and FIG. 15B shows a cut-away view of the multi-serving of the brewing material 42a, the multi-serving holder 32, and the multi-serving tamping pedestal 36 after tamping. A spring 34a holds the multi-serving holder 32 in a first higher position providing volume for the multi-serving of the brewing material 42a. The second motion of the coffee maker lid 14 (see FIG. 14C) pushes the holder 32 down against the spring 34a and the pedestal 36a enters the holder 32 and the multi-serving of the brewing material 42a is tamped.

Figure 16A:
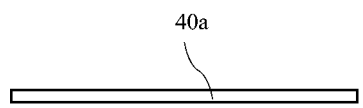
FIG. 16A shows a side view of a multi-serving tamper according to the present invention.
Figure 16B:
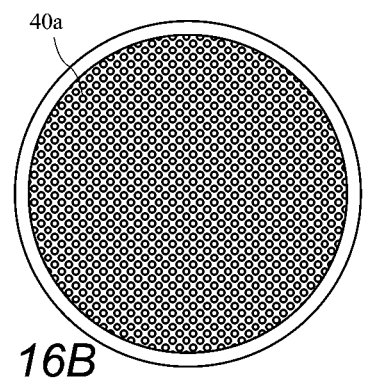
FIG. 16B shows a top view of the multi-serving tamper according to the present invention
Figure 17:
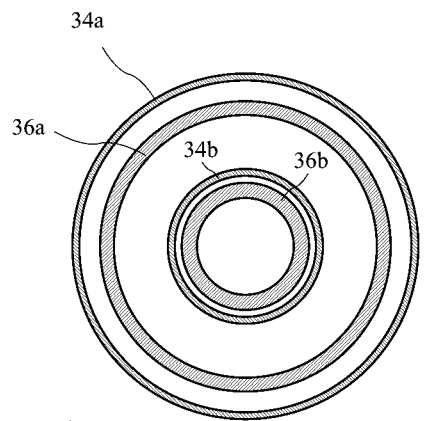
FIG. 17 shows a top view of the multi-serving pedestal according to the present invention.

FIG. 16A shows a side view of a multi-serving tamper 40a, FIG. 16B shows a top view of the multi-serving tamper 40a, and FIG. 17 shows a top view of the multi-serving pedestal 36a. The multi-serving tamper 40a resides in the holder 32 under the multi-serving of the brewing material 42a and above the pedestal 36a. The pedestal 36a is hollow providing room for the single serving pedestal 36b and spring 34b. The multi-serving tamper 40a thus provides a floor for tamping the multi-serving of the brewing material 42a. The multi-serving tamper 40a preferably is perforated to allow brewed coffee to pass through the multi-serving tamper 40a. The multi-serving tamper 40a is removed when the single serving holder 30 is used.

Figure 18A:
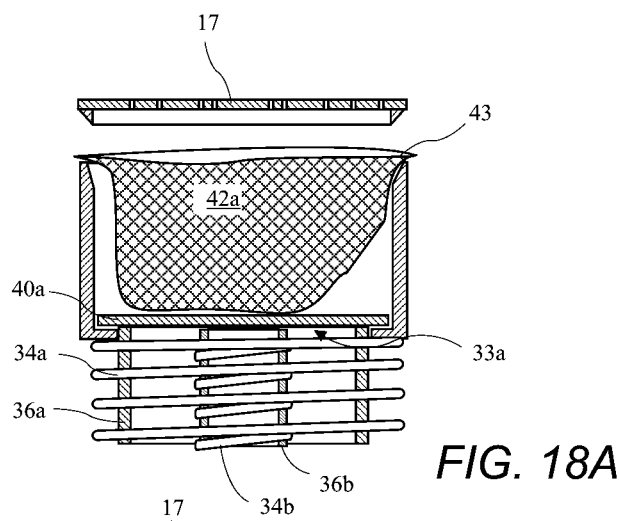
FIG. 18A shows a cross-sectional view of the multi-serving of the brewing material, the multi-serving holder, and the multi-serving tamping pedestal before placing the holder lid onto the holder according to the present invention.
Figure 18B:
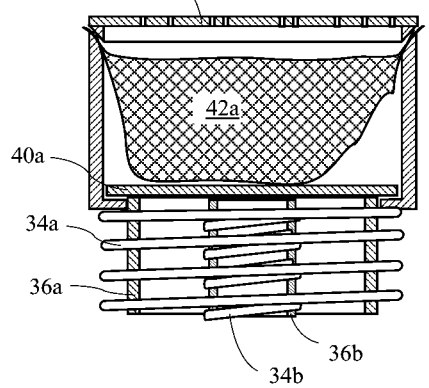
FIG. 18B shows a cross-sectional view of the multi-serving of the brewing material, the multi-serving holder, and the multi-serving tamping pedestal after placing the holder lid onto the holder and before tamping, according to the present invention.
Figure 18C:
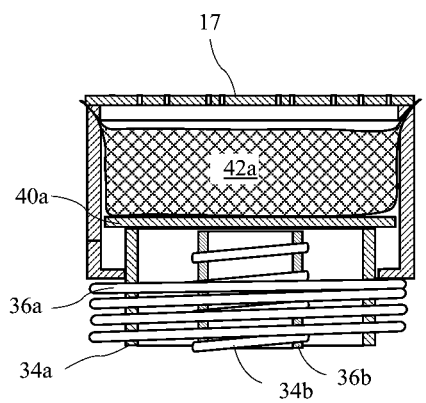
FIG. 18C shows a cross-sectional view of the multi-serving of the brewing material, the multi-serving holder, and the multi-serving tamping pedestal after placing the holder lid onto the holder and after tamping, according to the present invention.

FIG. 18A shows a cross-sectional view of the multi-serving of the brewing material 42a, the multi-serving holder 32, and the multi-serving tamping pedestal 34a before placing the holder lid 17 onto the holder 32, FIG. 18B shows a cross-sectional view of the multi-serving of the brewing material 42a, the multi-serving holder 32, and the multi-serving tamping pedestal 34a after placing the holder lid 17 onto the holder 34a and before tamping, and FIG. 18C shows a cross-sectional view of the multi-serving of the brewing material 42a, the multi-serving holder 32, and the multi-serving tamping pedestal 34a after placing the holder lid 17 onto the holder 32 and after tamping. The multi-serving of the brewing material 42a preferably comprises brewing material held in filter paper having a rim 43. In the first motion, the holder lid 17 and holder 32 sandwich the rim 43, and in the second motion the pedestal 34a enters the holder 32 and tamps the multi-serving of the brewing material 42a.

Figure 19C:
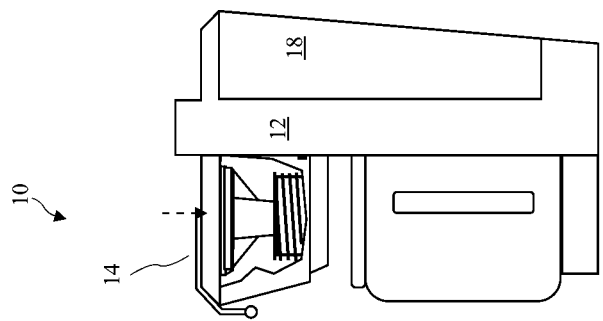
FIG. 19C shows the coffee maker lid closed over the single-serving of brewing material in the first single serving holder in the coffee maker, after tamping, according to the present invention.
Figure 19B:
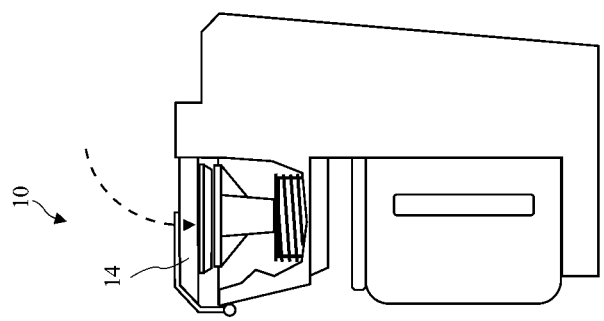
FIG. 19B shows the coffee maker lid closed over the single-serving of brewing material in the first single serving holder in the coffee maker, before tamping, according to the present invention.
Figure 19A:
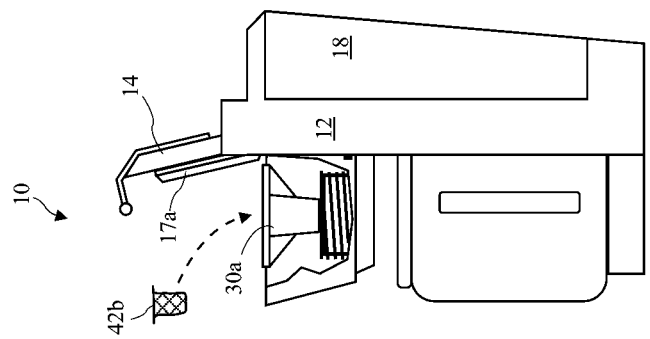
FIG. 19A shows a single-serving of brewing material being placed into a first single serving holder in the coffee maker according to the present invention.

FIG. 19A shows a single-serving of brewing material 42b being placed into a first single serving holder 30a in the coffee maker 10, FIG. 19B shows the coffee maker lid 14 closed over the single-serving of brewing material 42b in the first single serving holder 30a in the coffee maker 10 before tamping, and FIG. 19C shows the coffee maker lid 14 closed over the single-serving of brewing material 42b in the first single serving holder 30a in the coffee maker 10 after tamping. In the first motion, the holder lid 17 and holder 30a sandwich the rim 43, and in the second motion the pedestal 34a enters the holder 30a and tamps the multi-serving of the brewing material 42a.

FIG. 20A shows a single-serving of brewing material 42b being placed into a second single serving holder 30b in the coffee maker 10, FIG. 20B shows the coffee maker lid 14 closed over the single-serving of brewing material 42b in the second single serving holder 30b in the coffee maker 10 before tamping, and FIG. 20C shows the coffee maker lid closed 14 over the single-serving of brewing material 42b in the second single serving holder 30b in the coffee maker 10 after tamping. In the first motion, the holder lid 17 and holder 30b sandwich the rim 43, and in the second motion the pedestal 34a enters the holder 30b and tamps the multi-serving of the brewing material 42a.

Figure 21A:
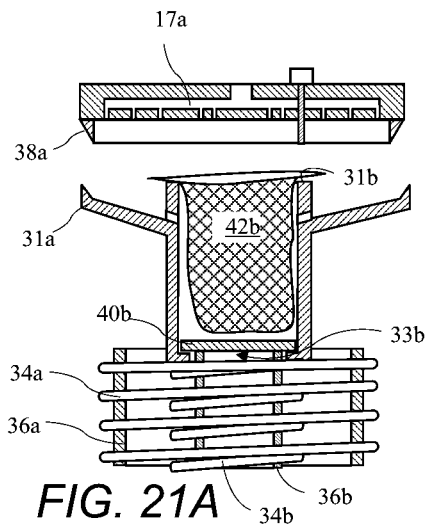
FIG. 21A shows a cross-sectional view of the single-serving of brewing material placed into a first single serving holder in the coffee maker according to the present invention.
Figure 21B:
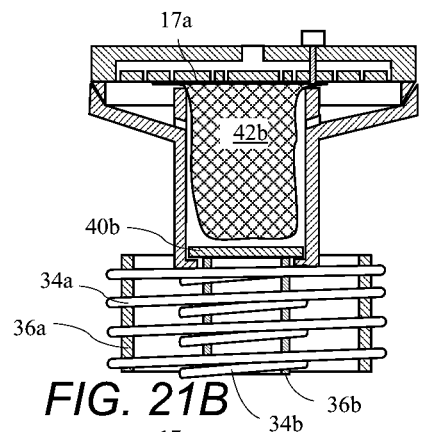
FIG. 21B shows a cross-sectional view of the coffee maker lid closed over the single-serving of brewing material in the first single serving holder in the coffee maker, before tamping, according to the present invention.
Figure 21C:
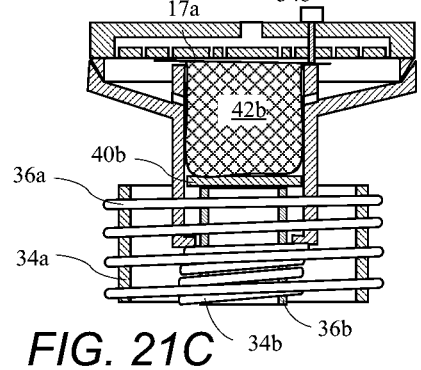
FIG. 21C shows a cross-sectional view of the coffee maker lid closed over the single-serving of brewing material in the first single serving holder in the coffee maker, after tamping, according to the present invention.

FIG. 21A shows a cross-sectional view of the single-serving of brewing material 42a placed into a first single serving holder 30a in the coffee maker 10, FIG. 21B shows a cross-sectional view of the coffee holder lid 17a (see FIGS. 5A, 5B, and 6) closed over the single-serving of brewing material 42a in the single serving holder 17a in the coffee maker 10 before tamping, and FIG. 21C shows a cross-sectional view of the coffee maker lid 17a closed over the single-serving of brewing material 42b in the single serving holder 17a in the coffee maker 10 after tamping. The single serving holder 30a has a large mouth 31a which covers the entire lower face 17' of the holder lid 17a. All of the water provided through all of the passages 19 in the lid 17a are directed into the single serving holder 30a removing any need to control the flow of water to the passages 19. Tapers 38a of the holder lid 17a and 38b of the holder 30a cooperate to position and close the lid 17a on the holder 30a. The rim 43 of the single serving of the brewing material 42b resides over a second mouth 31b of the holder 30a and is sandwiched between the holder 30a and lid 17a.

Figure 22A:
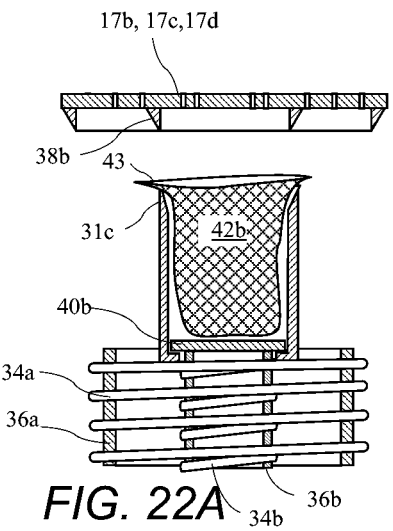
FIG. 22A shows a cross-sectional view of the single-serving of brewing material placed into a second single serving holder in the coffee maker according to the present invention.
Figure 22B:
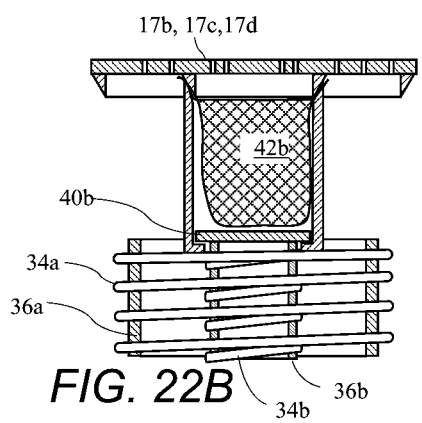
FIG. 22B shows a cross-sectional view of the coffee maker lid closed over the single-serving of brewing material in the second single serving holder in the coffee maker, before tamping, according to the present invention.
Figure 22C:
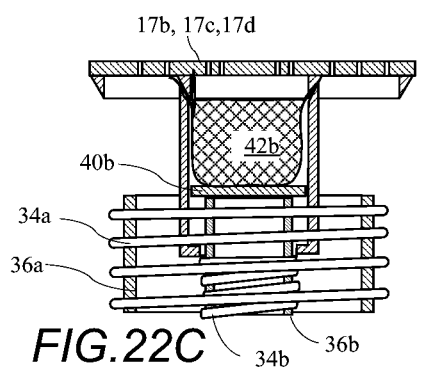
FIG. 22C shows a cross-sectional view of the coffee maker lid closed over the single-serving of brewing material in the second single serving holder in the coffee maker, after tamping, according to the present invention.

FIG. 22A shows a cross-sectional view of the single-serving of brewing material 42b placed into the second single serving holder 30b in the coffee maker 10, FIG. 22B shows a cross-sectional view of the coffee maker lid 17b, 17c, or 17d closed over the single-serving of brewing material 42b in the single serving holder 30b in the coffee maker 10 before tamping, and FIG. 22C shows a cross-sectional view of the coffee maker lid 17b, 17c, or 17d closed over the single-serving of brewing material 42b in the single serving holder 30b in the coffee maker 10 after tamping. The holder 30b is pushed down over the pedestal 36b to tamp the coffee.

Figure 23A:
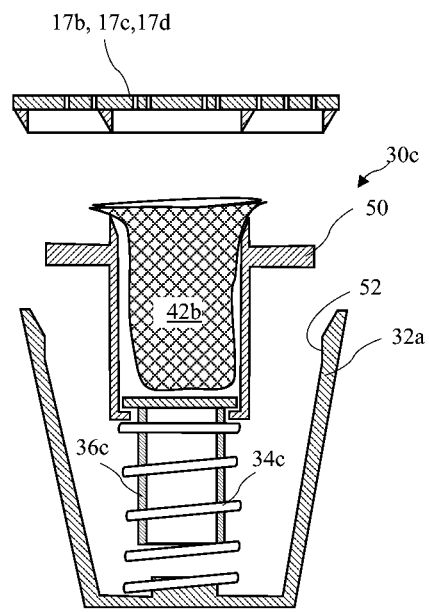
FIG. 23A shows a single serving coffee holder over a spring residing in the multi-cup holder before tamping, according to the present invention.
Figure 23B:
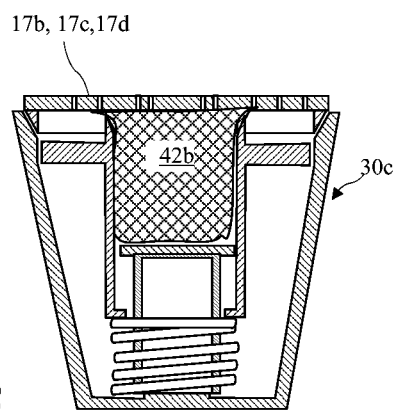
FIG. 23B shows the single serving coffee holder over a spring residing in the multi-cup holder after tamping, according to the present invention.

FIG. 23A shows a single serving coffee holder 30c over a spring 34c residing in a multi-cup holder 32a before tamping and FIG. 23B shows the single serving coffee holder 30c over the spring 34c residing in the multi-cup holder 32a after tamping. The holder lid 17b, 17c, or 17d is pressed down onto the holder 30c pushing the holder 30c into the multi-cup holder 32a causing the pedestal 36c to enter the holder 30c and tamp the coffee 42b. The single serving coffee holder 30c includes arms 50 which rest in seats 52 when the single serving coffee holder 30c is seated in the multi-cup holder 32a after tamping.

FIG. 24A shows a single serving coffee holder 30d with a fixed volume before tamping and FIG. 24B shows the single serving coffee holder 30d after tamping. The single serving coffee holder 30d is used similarly to the holder 30c and may include the arms 50 to rest in seats 52.

FIG. 25A shows a single serving coffee holder 30e with a spring 34d inside the holder 30e under a single serving package limiting an increase in volume after tamping, before tamping, according to the present invention.

FIG. 25B shows the single serving coffee holder with a spring under the single-serving of brewing material 42b limiting an increase in volume after tamping and allowing use of various size single-serving of brewing material 42b. after tamping. The single serving coffee holder 30e is used similarly to the holder 30c and may include the arms 50 to rest in seats 52.

Figure 26A:
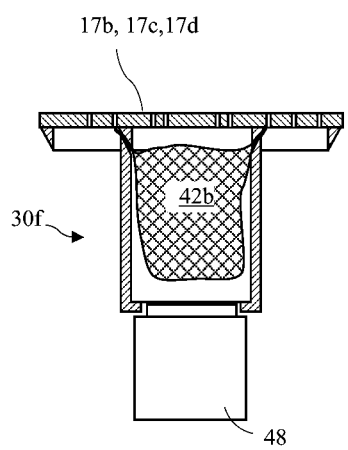
FIG. 26A shows a single serving coffee holder with a vertical ram under the single serving package before tamping, according to the present invention.
Figure 26B:
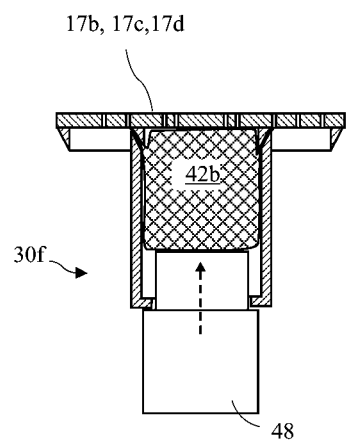
FIG. 26B shows the single serving coffee holder with the vertical ram under the single serving package after tamping, according to the present invention.

FIG. 26A shows a single serving coffee holder 30f with a vertical ram 48 under the single-serving of brewing material 42b before tamping and FIG. 26B shows the single serving coffee holder 30f with the vertical ram 48 under the single-serving of brewing material 42b after tamping. The vertical ram may be a solenoid, a linear motor, or the like The single serving coffee holder 30f is used similarly to the holder 30c and may include the arms 50 to rest in seats 52.

Figure 27A:
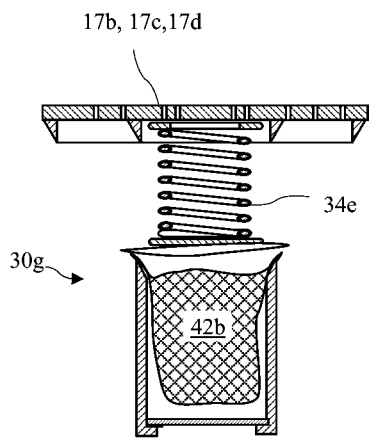
FIG. 27A shows a single serving coffee holder and holder lid with a tamping spring before tamping, according to the present invention.
Figure 27B:
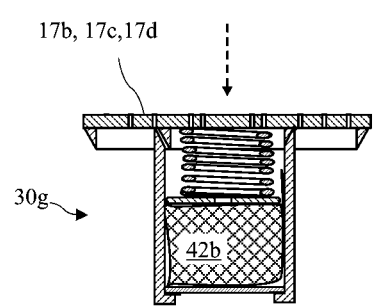
FIG. 27B shows the single serving coffee holder and holder lid with the tamping spring after tamping, according to the present invention.

FIG. 27A shows a single serving coffee holder and holder lid with a tamping spring 34e residing between the holder lid 17b, 17c, or 17d before tamping and FIG. 27B shows the single serving coffee holder 30g and holder lid 17b, 17c, or 17d with the tamping spring 34e after tamping. When the lid 17b, 17c, or 17d is pressed down against the holder 30g, the spring 34e enters the holder 30g and tamps the single-serving of brewing material 42b. The single serving coffee holder 30g is used similarly to the holder 30c and may include the arms 50 to rest in seats 52.

Figure 28A:
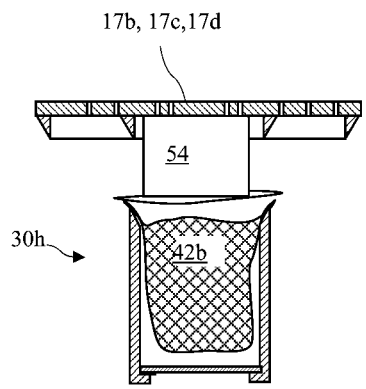
FIG. 28A shows a single serving coffee holder and holder lid with a tamping block before tamping, according to the present invention.
Figure 28B:
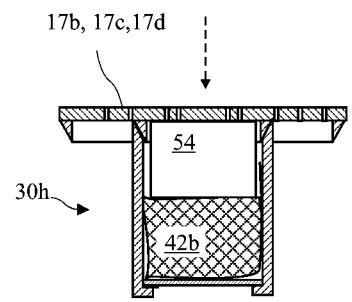
FIG. 28B shows the single serving coffee holder and holder lid with the tamping block after tamping, according to the present invention.

FIG. 28A shows a single serving coffee holder and holder lid 17b, 17c, or 17d with a tamping block 54 residing between the holder lid 17b, 17c, or 17d and the single-serving of brewing material 42b before tamping, and FIG. 28B shows the single serving coffee holder and holder lid 17b, 17c, or 17d with the tamping block 54 after tamping. The tamping block 54 may be ridged or compressible to some degree. The single serving coffee holder 30h is used similarly to the holder 30c and may include the arms 50 to rest in seats 52.

Figure 29A:
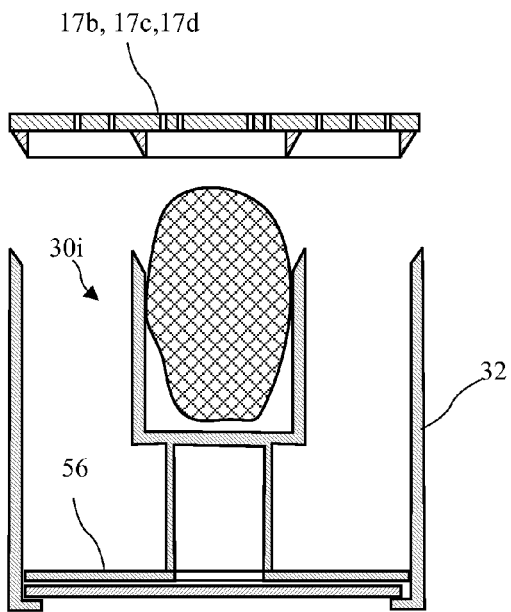
FIG. 29A shows a single serving coffee holder with a fixed volume before tamping, according to the present invention.
Figure 29B:
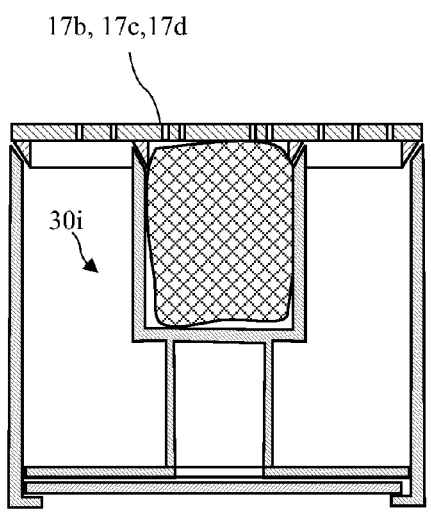
FIG. 29B shows a single serving coffee holder with a fixed volume after tamping, according to the present invention.

FIG. 29A shows a single serving coffee holder 30i with a fixed volume and a lower positioning disk 56 before tamping, and FIG. 29B shows the single serving coffee holder 30i with a fixed volume before tamping. The holder 30i has a limited volume and pushing the holder lid 17b, 17c, or 17d onto the holder 30i tamps the single-serving of brewing material 42b in the holder 30i. The single serving coffee holder 30i is positioned in the holder 32, or in the cavity 11 (see FIG. 4B) by the lower positioning disk 56.

Figure 30A:
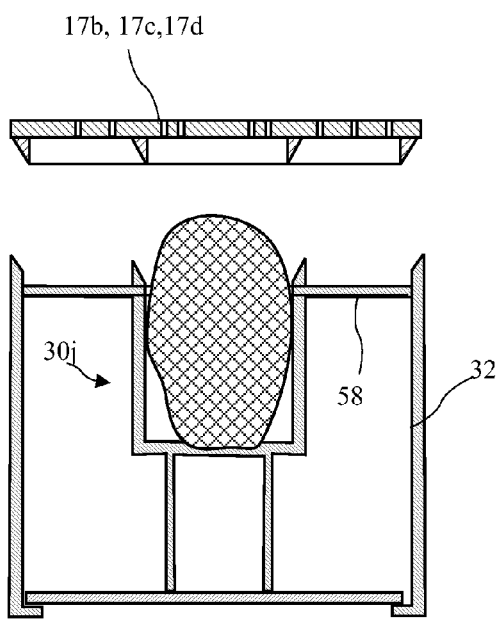
FIG. 30A shows a single serving coffee holder with a fixed volume and an upper positioning disk before tamping, according to the present invention.
Figure 30B:
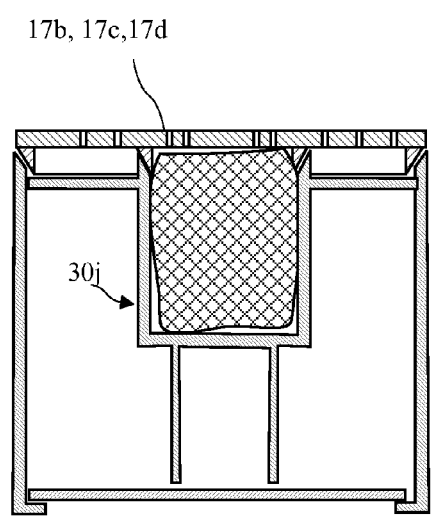
FIG. 30B shows a single serving coffee holder with a fixed volume and the upper positioning disk after tamping, according to the present invention.

FIG. 30A shows a single serving coffee holder 30j with a fixed volume and an upper positioning disk 58 before tamping, and FIG. 30B shows the single serving coffee holder 39j with a fixed volume and the upper positioning disk 58 after tamping. The holder 30j has a limited volume and pushing the holder lid 17b, 17c, or 17d onto the holder 30j tamps the single-serving of brewing material 42b in the holder 30j. The single serving coffee holder 30i is positioned in the holder 32, or in the cavity 11 (see FIG. 4B) by the upper positioning disk 58.

Figure 31:
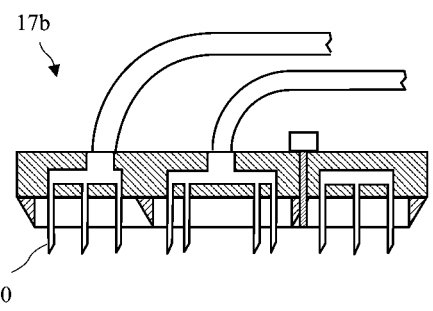
FIG. 31 shows a holder lid with needles for injecting water into the coffee.

FIG. 31 shows a holder lid with needles 60 for injecting water into the coffee. Any of the lids 17a-17d may include such needles. The needles 60 may comprise a single, generally centered needle, or a plurality of needles.

Figure 32:
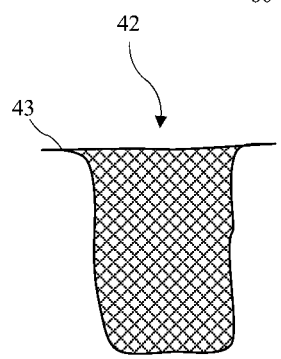
FIG. 32 shows a filter paper coffee pack with a rim formed around the top.

FIG. 32 shows a filter paper coffee pack 42 with a rim 43 formed around the top. The rim 43 may be captured between the holder and holder lid and hold the filter paper coffee pack 42 taut, for example, to facilitate puncture by the needles 60.

Figure 33:
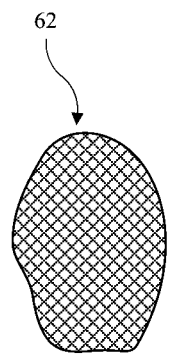
FIG. 33 shows filter paper coffee pack without a rim.

FIG. 33 shows filter paper coffee pack 62 without a rim. The filter paper coffee pack 62 may be used in any of the embodiments described herein as a substitute for a rimmed filter paper coffee pack.

Figure 34:
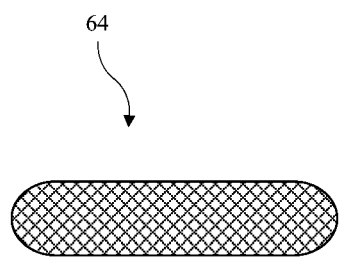
FIG. 34 shows a coffee pod suitable for use with the present invention.

FIG. 34 shows a coffee pod 64 suitable for use with the present invention. The coffee pod 64 may be used in any of the embodiments described herein as a substitute for a rimmed filter paper coffee pack.

Figure 35:
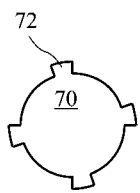
FIG. 35 shows a coffee holder base with engagement features, according to the present invention.
Figure 36:
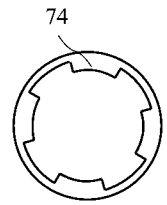
FIG. 36 shows cooperating coffee maker engagement features, according to the present invention.

FIG. 35 shows a coffee holder base 70 with engagement features 72 and FIG. 36 shows cooperating features 74. The features 72 and 74 may be provided on the holders and/or in the cavity 11 for attaching the holders to the coffee maker.

Various embodiments have described cooperation with water or heated water. Those skilled in the art will recognize that other liquids may be used in drinks, and a drink maker according to the present invention using any liquid is intended to come within the scope of the present invention.

While the present invention is described above in the context of a coffee maker having a coffee holder lid attached to a bottom surface of a coffee maker lid, in other embodiments the coffee maker may, for example, have a drawer, tray, slides, or the like and the coffee holder may received by the coffee maker in various ways as disclosed in the '501 application incorporated by reference above. Those skilled in the art will recognize that embodiments of the cooperation of a coffee holder and coffee maker disclosed in the '501 application may be modified to include a coffee holder lid attached to the coffee maker and configured to close the coffee holder after the coffee holder is positioned in the coffee maker for brewing coffee. Positioning the coffee holder lid on the coffee holder may be mechanically coupled to the action of inserting the coffee holder into the coffee maker, or may be electro-mechanically closed onto the coffee holder after the coffee maker senses that the coffee holder has been received by the coffee maker, for example, by a solenoid or by a linear motor.

Further, many embodiments are described as including a coffee chamber comprising a filter paper cup. In many cases, a filter cup made of nylon mesh or metal mesh is equally suitable, and any coffee holder or combination of coffee maker and coffee holder including a filter chamber which holds coffee and allows the coffee to be tamped as described above is intended to come within the scope of the present invention regardless of the specific filter material.

While the invention herein disclosed has been described by means of specific embodiments and applications thereof, numerous modifications and variations could be made thereto by those skilled in the art without departing from the scope of the invention set forth in the claims.

I claim:

1. A multi-mode coffee maker comprising:
    a water container;
    a water pump;
    a water heater;
    a coffee holder receptacle;
    a removable single serving coffee holder having a single serving top edge providing a single serving mouth;

a multi-serving coffee holder having a multi serving top edge providing a multi serving mouth, the multi serving mouth having a larger area than the single serving mouth;

a holder lid attached to the coffee maker, the holder lid resides against the single serving mouth to close the single serving coffee holder and against the multi serving mouth to close the multi serving coffee holder; and a mode switch controlling the amount of water provided to both the single serving coffee holder and the multi-serving coffee holder, the mode switch actuated automatically when a single serving is prepared, wherein the mode switch is actuated by a single serve probe attached to the coffee maker and making contact with the single serving coffee holder when the single serving coffee holder resides in the coffee maker.

2. The multi-mode coffee maker of claim 1, wherein:

the mode switch controls the provision of water to both first water passages aligned with the multi-serving coffee holder and second passages aligned with the single serving coffee holder;

water is provided to both the first water passages and the second water passages in a multi-serving mode; and water is provided to only the second water passages in a single serving mode.

3. The multi-mode coffee maker of claim 1, wherein the single serving mouth is aligned with single serving water passages in a mating face on a bottom of the holder lid.

4. The multi-mode coffee maker of claim 1, wherein the coffee holders include tapered mouths for mating cooperation with the holder lid.

5. The multi-mode coffee maker of claim 1, wherein the single serving coffee holder has the same general depth as the multi serving coffee holder, and multi serving coffee holder has a larger horizontal cross-section providing greater volume.

6. The multi-mode coffee maker of claim 1, wherein the single serving coffee holder is insertable and removable from the coffee maker independently of the multi serving coffee holder.

7. A multi-mode coffee maker comprising:
a water container;
a water pump;
a water heater;
a coffee holder receptacle;
a single serving coffee holder having a single serving top edge providing a single serving mouth;
a multi-serving coffee holder having a multi serving top edge providing a multi serving mouth, the multi serving mouth having a larger area than the single serving mouth;
a holder lid attached to the coffee maker, the holder lid resides against the single serving mouth to close the single serving coffee holder and against the multi serving mouth to close the multi serving coffee holder;
first water passages aligned with the multi-serving coffee holder;
second passages aligned with the single serving coffee holder; and
a gate in the holder lid, the gate blocking the flow of water to the first water passages when the single serving coffee holder is present in the coffee maker.

8. The multi-mode coffee maker of claim 7, wherein the gate is aligned with a mouth of the single serving coffee holder, and closing the holder lid over the single serving coffee holder causes the gate to be pushed into the holder lid blocking the flow of water to the first water passages.

9. A multi-mode coffee maker comprising:
a water container;
a water pump;
a water heater;
a coffee holder receptacle;
a single serving coffee holder having a single serving top edge providing a single serving mouth;
a multi-serving coffee holder having a multi serving top edge providing a multi serving mouth, the multi serving mouth having a larger area than the single serving mouth;
a holder lid attached to the coffee maker, the holder lid resides against the single serving mouth to close the single serving coffee holder and against the multi serving mouth to close the multi serving coffee holder;
first water passages aligned with the multi-serving coffee holder;
second passages aligned with the single serving coffee holder;
a plunger in the holder lid, the plunger blocking the flow of water to the first water passages when the single serving coffee holder is present in the coffee maker;
first water passages aligned with the multi-serving coffee holder;
second passages aligned with the single serving coffee holder; and
a plunger in the holder lid, the plunger blocking the flow of water to the first water passages when the single serving coffee holder is present in the coffee maker.

10. A multi-mode coffee maker comprising:
a water container;
a water pump;
a water heater;
a coffee holder receptacle;
a single serving coffee holder having a single serving top edge providing a single serving mouth;
a multi-serving coffee holder having a multi serving top edge providing a multi serving mouth, the multi serving mouth having a larger area than the single serving mouth;
a holder lid attached to the coffee maker, the holder lid resides against the single serving mouth to close the single serving coffee holder and against the multi serving mouth to close the multi serving coffee holder;
first water passages aligned with the multi-serving coffee holder;
second passages aligned with the single serving coffee holder;
a plunger in the holder lid, the plunger blocking the flow of water to the first water passages when the single serving coffee holder is present in the coffee maker;
the holder lid includes a mating face on a bottom surface of the holder lid;
the mating face includes a set of single serving water passages, all of the set of single serving water passages residing over a single serving interior of the single serving holder;
the mating face further includes additional water passages reside outside the single serving water passages and residing over a multi serving interior of the multi serving holder; and
the single serving coffee holder includes a second enlarged mouth enclosing the single serving mouth and extending outward under all of the additional water passages in the mating face and collecting water released through the additional water passages and directing the water released through the additional water passages into the single serving interior.

11. A multi-mode coffee maker comprising:
a water container;
a water pump;
a water heater;
a coffee holder receptacle;
a single serving coffee holder having a single serving top edge providing a single serving mouth;
a multi-serving coffee holder having a multi serving top edge providing a multi serving mouth, the multi serving mouth having a larger area than the single serving mouth;
a holder lid attached to the coffee maker, the holder lid resides against the single serving mouth to close the single serving coffee holder and against the multi serving mouth to close the multi serving coffee holder;
first water passages aligned with the multi-serving coffee holder;
second passages aligned with the single serving coffee holder; and
a plunger in the holder lid, the plunger blocking the flow of water to the first water passages when the single serving coffee holder is present in the coffee maker,
wherein the coffee holders reside over pedestals in the coffee maker, and closing the holder lid against the coffee holders pressed the coffee holders down and the pedestals into the coffee holders to tamp coffee contained within the coffee holders.

12. The multi-mode coffee maker of claim 11 wherein the pedestals comprise a first hollow pedestal cooperating with the multi-serving coffee holder and a second pedestal residing in the first hollow pedestal cooperating with the single serving coffee holder.

13. The multi-mode coffee maker of claim 12, wherein:
the multi-serving housing includes first and second pedestal passages, the first and second pedestals respectively passing there through; and
first and second springs having diameters greater than the first and second pedestal passages reside outside the first and second pedestals and contact the housings outside the pedestal passages supporting the housings.

14. A multi-mode coffee maker comprising:
a water container;
a water pump;
a water heater;
a coffee holder cavity;
a multi-serving coffee holder configured to attach to the coffee maker and reside in the coffee holder cavity;
a single serving coffee holder configured to reside in the multi-serving coffee holder;
a holder lid attached to the coffee maker, the holder lid configured to mate with both the single serving coffee holder and the multi-serving coffee holder to close the coffee holder; and
a tamper configured to tamp coffee within the holders when the holder lid mates with the holders.

15. A multi-mode coffee maker comprising:
a water container;
a water pump;
a water heater;
a coffee holder receptacle;
a single serving coffee holder having a single serving top edge providing a single serving mouth;
a multi-serving coffee holder having a multi serving top edge providing a multi serving mouth, the multi serving mouth having a larger area than the single serving mouth;
a holder lid attached to the coffee maker, the holder lid resides against the single serving mouth to close the single serving coffee holder and against the multi serving mouth to close the multi serving coffee holder;
first water passages aligned with the multi-serving coffee holder;
second passages aligned with the single serving coffee holder; and
a plunger in the holder lid, the plunger blocking the flow of water to the first water passages when the single serving coffee holder is present in the coffee maker,
wherein a bottom surface of the lid includes a mating face closing both the single serving coffee holder and the multi serving coffee holder, and the mating face includes a single serving area cooperating with the single serving holder and the multi serving holder, and a multi serving area cooperating with the multi serving holder only, the single serving area smaller than the multi serving area.

16. A multi-mode coffee maker comprising:
a water container;
a water pump;
a water heater;
a coffee holder receptacle;
a single serving coffee holder having a single serving top edge providing a single serving mouth;
a multi-serving coffee holder having a multi serving top edge providing a multi serving mouth, the multi serving mouth having a larger area than the single serving mouth;
a holder lid attached to the coffee maker, the holder lid resides against the single serving mouth to close the single serving coffee holder and against the multi serving mouth to close the multi serving coffee holder;
first water passages aligned with the multi-serving coffee holder;
second passages aligned with the single serving coffee holder; and
a plunger in the holder lid, the plunger blocking the flow of water to the first water passages when the single serving coffee holder is present in the coffee maker,
wherein:
the holder lid includes inner water passages aligned with the single serving coffee holder and aligned with the multi serving coffee holder, and outer water passages aligned with the multi serving coffee holder and not aligned with the single serving coffee holder, the inner and outer passages in fluid communication with interiors of the coffee holders; and
the outer water passages remain unblocked during operation of the coffee maker using the single serving coffee holder, and the flow of water to the outer water passages is interrupted for use of the single serving coffee holder.

17. A multi-mode coffee maker comprising:
a water container;
a water pump;
a water heater;
a coffee holder receptacle;
a single serving coffee holder;
a multi-serving coffee holder;
a holder lid attached to the coffee maker, the holder lid configured to cooperate with both the single serving coffee holder and the multi-serving coffee holder to close the coffee holder;

first water passages aligned with the multi-serving coffee holder;
second passages aligned with the single serving coffee holder; and
the coffee maker including one of:
- a gate in the holder lid, the gate blocking the flow of water to the first water passages when the single serving coffee holder is present in the coffee maker; and
- a plunger in the holder lid, the plunger blocking the flow of water to the first water passages when the single serving coffee holder is present in the coffee maker.

\* \* \* \* \*